May 13, 1958     T. O. R. DAHLBERG     2,834,114
MEASURING AND RECORDING DEVICES
Filed June 11, 1954     2 Sheets-Sheet 2
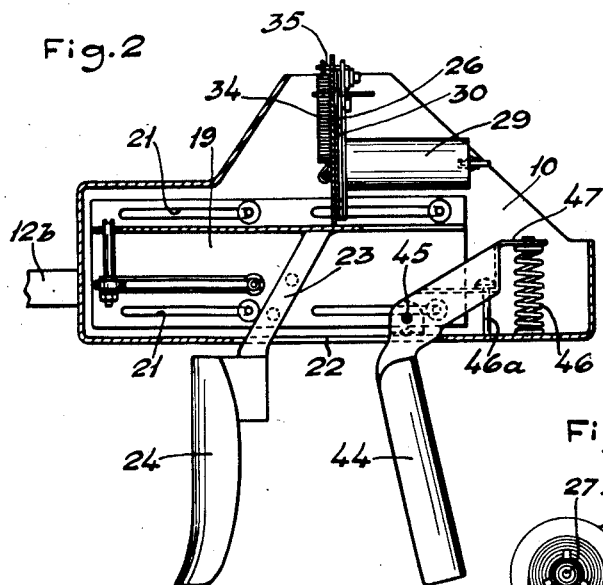
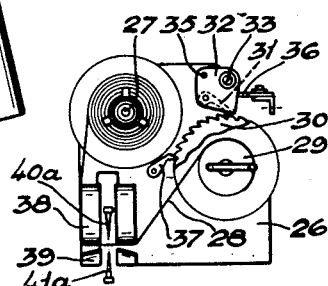
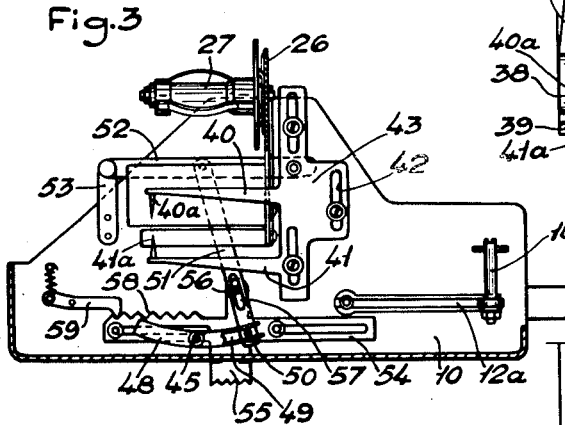
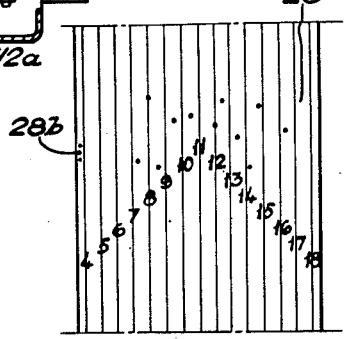
Inventor
T. O. R. Dahlberg
By Glascock Downing & Seebold
Attys.

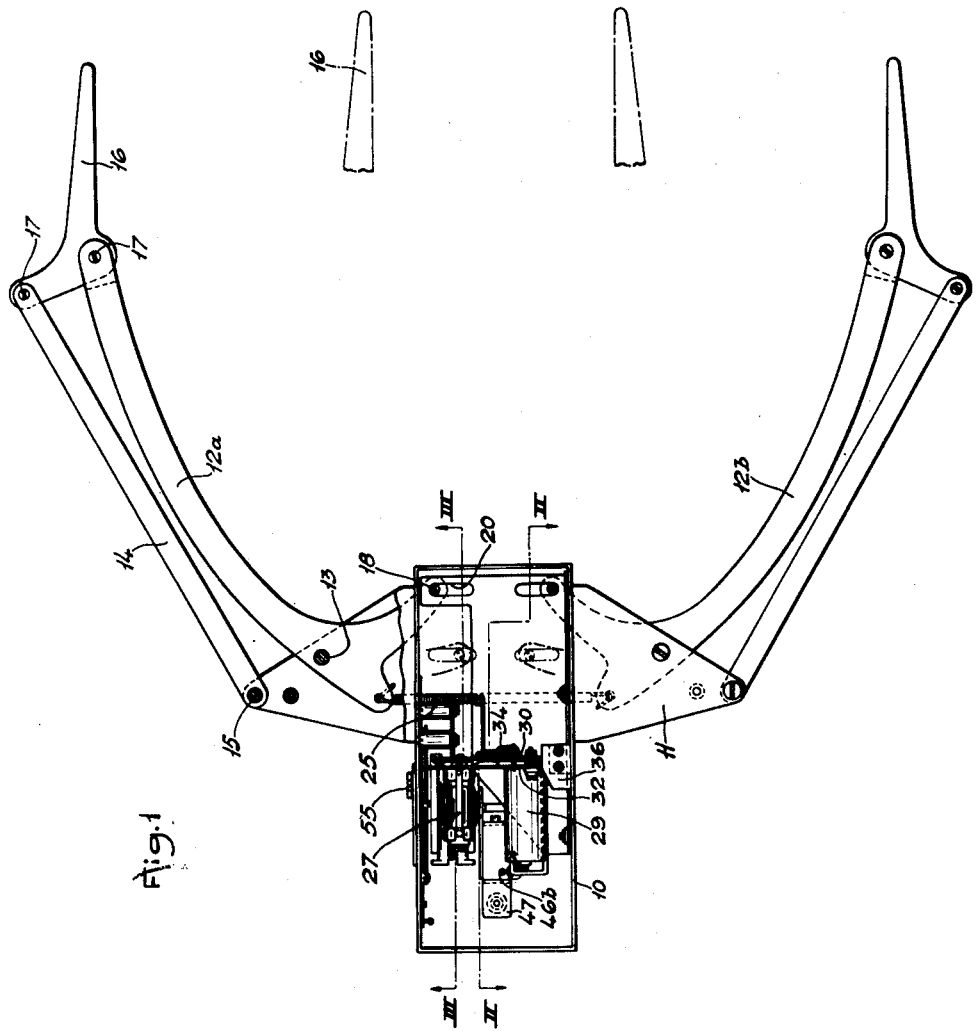

United States Patent Office 2,834,114
Patented May 13, 1958

2,834,114
MEASURING AND RECORDING DEVICES
Tord Olof Rickard Dahlberg, Bromma, Sweden
Application June 11, 1954, Serial No. 436,123
Claims priority, application Sweden June 12, 1953
6 Claims. (Cl. 33—148)

The present invention relates to a new and improved measuring device especially for use in forestry for grading and recording the dimensions and species of tree populations.

Usually, when a survey shall be made of the timber growing within a certain area, the thickness of each individual tree is measured, and the results are recorded in a protocol below headings which indicate the respective species. This method requires the participation of at least two persons, one who does the actual measuring, and another who keeps the record, usually by making punctures by a needle in the respective dimension and species columns.

It is obvious that this method is slow and unreliable, and that it does not eliminate the possibility of foul play. Further the record does not give an indication of the actual distribution of dimensions and species within the area explored.

The main object of this invention is the provision of a measuring device for timber and the like which is easily portable and which greatly facilitates the recording of the pertinent data.

A further object of the invention is the provision of a record mechanism for the purpose specified using a record strip on which the different dimensions are recorded in the transverse sense of the strip.

A still further object of the invention is the provision of tapering recording needles which are brought to penetrate the record strip to different depths and/or from opposite directions to indicate different species.

Other objects and advantages of the invention will be apparent from the following description, reference being had therein to the accompanying drawings.

In the drawings

Fig. 1 is a top plan view of a measuring device with its cover partly removed. Fig. 2 is a section on line II—II in Fig. 1. Fig. 3 is a section on line III—III in Fig. 1. Fig. 4 is a rear view of the paper strip feed mechanism. Fig. 5 is a fragmentary side elevation of a control mechanism. Fig. 6 illustrates a portion of a record strip as it might look after a number of registrations have been made.

In the drawing numeral 10 designates a casing from each lateral side of which two spaced plate members 11 extend transversally. From between each pair of plates 11 a measuring shank 12a and 12b respectively projects outwardly and forwardly, being articulated at its inner end as at 13. Alongside each shank 12a, 12b a link member 14 is provided, being pivoted as at 15 at its inner end between plates 11. The outer ends of each shank 12a, 12b and the corresponding ends of link members 14 are connected as at 17, 17 by the shorter arm of an angularly bent two-armed lever 16, the longer arm thereof forming a measuring jaw. These both measuring jaws are disposed parallelly to each other whatever be the angular position of shanks 12a, 12b as indicated with chain lines in Fig. 1. The inner ends of measuring shanks 12a, 12b form each the second, shorter arm of a three-armed lever and are each provided at its extremity with a lug 18 which each engages an elongated, transversally disposed slot 20 in a slide member 19 which is arranged for a reciprocable fore and aft travel within casing 10 along guide members 21. Slide member 19 has a shank member 23 secured thereto which extends downwards through a slit 22 in the bottom of casing 10 (Fig. 2). A handle 24 is secured to shank member 23, and the arrangement is such that when slide member 19 is displaced rearwards along guide members 21 by means of handle 24, the measuring jaws 16 are brought towards each other in a parallel movement against the action of a coil spring 25 which connects the third, shortest arms of measuring shanks 12a, 12b, and so that a certain length of travel of slide member 19 corresponds to a certain greater decrease of the distance between jaws 16. The instantaneous position of slide member 19 in casing 10 thus is a measure in a certain scale of the distance between the measuring jaws. The recording mechanism provided within the device will now be described.

On slide member 19 an upright transverse plate member 26 is disposed (Figs. 2 to 4). On said plate 26 a spool 27 carrying a record strip 28 is rotatively mounted. From spool 27 strip 28 is led downwards in between two pairs of horizontally disposed guide lugs 38 and 39 respectively which project from the face of plate 26 and support strip 28 during recording, as is best seen from Fig. 4.

From between guide lugs 38, 39 the strip 28 passes onto a second spool 29, secured to a ratchet wheel 30 which is mounted for rotation on plate 26. A latch member 31 is pivotally supported on a plate 32 which in its turn is pivotally supported as at 33 by plate 26. Latch 31 engages the ratchet wheel 30 and is biased counterclockwise in Fig. 4 by a spring 34 which is secured to a projection 35 extending through a slot in plate 26. A plate member 36 secured to the inside of casing 10 has an oblique edge along which plate 32 will travel when slide member 19 is moved rearwards with handle 24, and during that movement plate 32 will be swung counterclockwise by spring 34. Already at the beginning of the slide movement latch member 31 will rotate ratchet wheel 30 a pitch distance. A second latch 37 pivoted to plate 26 prevents rotation of the ratchet wheel in the opposite direction on the return travel of the slide member 19. The strip 28, therefore, is kept tensioned.

Between the two pairs of guide lugs 38, 39 two rigid arms 40 and 41 are disposed. Arms 40 and 41 extend rearwards from a slide member 43 which is arranged for vertical travel on guide means 42 within casing 10. At the outer free end of each arm 40, 41 a pointed needle 40a, 41a respectively is secured at right angles to that portion of the record strip disposed between guide lugs 38, 39. When slide member 43 travels upwards or downwards the one or other needle 40a, 41a penetrates through the record strip. The position of the needle mark in the transverse direction of the strip will depend on the amount of displacement of slide member 19 which in its turn depends on the distance between measuring jaws 16.

The displacements of slide member 43 are actuated by a handle 44 which projects downwardly from casing 10 at the rear of handle 24 (Fig. 2). Handle 44 is rigidly secured to a shaft 45 rotatively mounted in casing 10, and it is normally kept in its rear, rest position by a strong spring 46 bearing upon an extension 47 of the handle and the bottom of casing 10 respectively. The rest position of handle 44 may be adjusted with a set screw 46a, and likewise its opposite end position may be set with a screw 46b which engages the bottom of casing 10 (Fig. 1). Spring 46 is so dimensioned in relation to spring 25 between measuring shanks 12a and 12b that on actuation of handles 24, 44 which are simultaneously squeezed with one hand the measuring jaws 16 have to engage the object to be measured before handle 44 will be moved and shaft 45 will be turned. A circularly curved two-armed lever 48 is secured to shaft 45 and will consequently be rocked on rotation of the latter. In the side face of lever 48 a circularly curved slot 49 is disposed. A lug 50 provided at one end of a link member 51 the effective length of which equals the radius of curvature of slot 49 engages the latter. Link 51 is pivotally connected to between the ends of a second link 52 which is in its turn pivotally supported with one end by an arm 53 rigidly secured to casing 10. The other end of link 52 is articulated to slide member 43. When lever 48 is rocked on actuation of handle 44 slide member 43 will be displaced upwards or downwards depending on at which side of shaft 45 lug 50 engages slot 49. The setting of lug 50 is made thus (Fig. 3): A control slide 54 which runs on guides in casing 10 and is provided with a control button 55 has a lug 56 which engages an elongated slot 57 in link 51. The engagement position of lug 50 with lever 48 can be set between two extreme end positions, one at each side of shaft 45. Through the provision of teeth 59 on slide 54 and a spring biased latch 59 engaging teeth 58, a number of predetermined positions can be set. The direction of travel of slide member 43 on actuation of handle 44 will depend on whether lug 50 is disposed at the one or the other side of shaft 45. Thus either the needle 40a of the upper arm 40 or the needle 41a of the lower arm 41 will penetrate through the record strip. If lug 50 is set directly opposite shaft 45 no displacement of slide member 43 will take place on actuation of handle 44. The needle penetration depths can be determined on beforehand by setting lug 50 in any one of its different possible positions. The markings in the record strip consequently may be made with a more or less deep penetration of the needle, and by use of the one or the other needle. The needles should taper rather much so as to give an easily perceived difference in the size of the markings for different penetrations. The direction of the needle penetration through the record strip is easy to assess, and thus for example different tree species may be clearly distinguished between. The control button 55 (Fig. 5) is used for selecting the needle to be used as well as for setting the penetration depth. For that purpose button 55 is provided with an index and may be displaced along a set of markings 60 provided at the outside of casing 10 with an idle position in the middle and in the shown embodiment three markings at either side, D, A, B and G, T, L respectively, which correspond to different penetrations of the one or other needle. If so should be desired, the travel of the needles may be made so short in one postion that only indentations are made in the record strip.

If still other markings in the record strip should be desirable, these could be made at one edge of the strip according to any suitable code. For that purpose one or more "empty" registrations are made which will be situated close to one longitudinal edge of the record strip, as indicated at 28b in Fig. 6. The record strip 28 is divided into columns through lines running along the length of the strip, and nominal diameter measures such as 4 ins., 5 ins., 6 ins., etc. correspond to each line as shown in Fig. 6. A number of markings are also indicated by dots.

Since the probability that two consecutive markings shall correspond to exactly the same diameter dimension is very small the feed movements between consecutive registrations can be made very short. On a strip of a limited length therefore a very great number of registrations can be made.

The accuracy of the measuring device is sufficient for making estimations possible of dimensions lying between the nominal ones. That means a further advantage compared with the common measuring and accounting methods which are more summary. Further the record strip permits a concept of the distribution of dimensions and species which cannot be read out from a simple listing of these data.

The measuring device may be provided with a cover above the record strip which cover can be locked or secured by seal in order to prevent any interference with the registrations. The device is preferably manufactured of a light metal alloy to make it easily portable, and for the record strip paper is advantageously used.

The useful field of the measuring device is not restricted to the measuring of trees and timber, but it could be used for many other measuring and recording purposes as well.

Having now described my invention, what I claim as new and desire to secure by Letters Patent is:

1. A portable instrument for measuring and recording diameter dimensions of growing timber and the like comprising a protective cover, a record strip therein, two measuring shanks pivotally supported by and extending outside the cover, with the shanks having simultaneous movement toward and away from each other, a measuring jaw at one end of each shank, link means connected to guide the jaws in parallel relationship to each other upon the movement of the shanks, recording means, and means to actuate the recording means to make an impression on the record strip in dependence of the measuring shanks having engaged the object to be measured, handle means to bring the jaws into engagement with the object to be measured, a longitudinal slide member, means securing the handle means to the slide member, the slide member being operatively connected to the measuring shanks to bring the jaws to engage the object to be measured and to assume actuated positions having a predetermined linear relationship to the distance between the measuring jaws, spring means interconnecting the shanks and opposing the action of the slide member to bring the jaws to engage the object to be measured, and a record guide for said strip and feed mechanism for said strip actuated by the slide member, said guide and mechanism being carried by said slide member for bringing the latter to engage a measuring object against the action of spring means, said slide member being provided with record strip guide and feed mechanism.

2. A measuring and recording instrument according to claim 1 comprising two handle members, one of said handle members being said handle means and operatively connected to said measuring shanks to bring the latter into engagement with the object to be measured upon actuation thereof, and said means to actuate said recording means including the other of said handle members, said handle members being disposed in close juxtaposition, and spring means acting to bias said last mentioned handle member towards its inoperative position, said last named spring means offering a greater resistance to the actuation of said last mentioned handle member than the resistance of the first mentioned spring means to the actuation of said first mentioned handle member.

3. A measuring and recording instrument according to claim 2, wherein said feed mechanism includes mechanism for feeding said record strip a certain length on actuation of said first mentioned handle member.

4. In a measuring and recording instrument for measuring and recording diameter dimensions and species of growing timber and the like the provision of a record strip, recording means including a needle located at each side of the record strip, means to actuate said recording means to make impression upon said record strip and control means for setting and limiting the penetration of said recording means, said recording means having a tapered shape to make punctures in said record strip having a size depending on the penetration depth of said recording means, and mechanism to selectively bring the needle at either side of said record strip into operation.

5. In a measuring and recording instrument for measuring and recording diameter dimensions and species of growing timber and the like the provision of a record strip, recording means including a needle located at each side of the record strip, means to actuate said recording means to make impression upon said record strip and control means for setting and limiting the penetration of said recording means, said recording means having a tapered shape to make punctures in said record strip having a size depending on the penetration depth of said recording means, and mechanism to selectively bring the needle at either side of said record strip into operation, and said means for controlling the setting and limiting being operatively connected to said selecting mechanism.

6. In a measuring and recording instrument for measuring an recording diameter dimensions and species of growing timber and the like the provision of a record strip, recording means including a needle located at each side of the record strip, means to actuate said recording means to make impression upon said record strip and control means for setting and limiting the penetration of said recording means, said recording means having a tapered shape to make punctures in said record strip having a size depending on the penetration depth of said recording means, and mechanism to selectively bring the needle at either side of said record strip into operation, the provision of two parallel arm members, said arm members projecting from a slide member being displaceable in the transverse sense of said record strip, said recording needles being disposed one at each free end of said arm members.

References Cited in the file of this patent

UNITED STATES PATENTS

| | | |
|---|---|---|
| 1,155,501 | Moore | Oct. 5, 1915 |
| 1,903,393 | Vlcek | Apr. 4, 1933 |
| 2,351,319 | Chase et al. | June 13, 1944 |
| 2,659,155 | Lotter | Nov. 17, 1953 |

FOREIGN PATENTS

| | | |
|---|---|---|
| 49,391 | Sweden | Jan. 16, 1919 |
| 53,774 | Sweden | Apr. 18, 1923 |
| 513,745 | Germany | Dec. 1, 1930 |